(12) United States Patent
Belew

(10) Patent No.: US 7,331,114 B1
(45) Date of Patent: Feb. 19, 2008

(54) MAGNETIC COMPASS STRUCTURE

(76) Inventor: Samuel B. Belew, 524 Vance Dr., Bristol, TN (US) 37620

( * ) Notice: Subject to any disclaimer, the term of this patent is extended or adjusted under 35 U.S.C. 154(b) by 0 days.

(21) Appl. No.: 11/390,872

(22) Filed: Mar. 28, 2006

Related U.S. Application Data

(60) Provisional application No. 60/665,686, filed on Mar. 28, 2005.

(51) Int. Cl.
*G01C 17/00* (2006.01)

(52) U.S. Cl. .......... 33/355 R; 33/364; 33/356; 356/142

(58) Field of Classification Search .......... 33/355 R, 33/333, 348, 356, 351, 352, 355 D, 363 R, 33/364, 365, 272, 1 E; 356/142, 247
See application file for complete search history.

(56) References Cited

U.S. PATENT DOCUMENTS

| | | | | |
|---|---|---|---|---|
| 811,777 A | * | 2/1906 | Konig | ........... 356/143 |
| 1,961,312 A | * | 6/1934 | Vion | ........... 33/364 |
| 1,966,845 A | * | 7/1934 | Carbonara | ........... 356/143 |
| 1,966,850 A | * | 7/1934 | Colt | ........... 356/143 |
| 2,111,829 A | * | 3/1938 | Winterer et al. | ........... 33/272 |
| 2,970,510 A | * | 2/1961 | Mixner | ........... 356/142 |
| 3,082,663 A | * | 3/1963 | Zweifel | ........... 356/139 |
| 3,862,500 A | * | 1/1975 | Wibom | ........... 33/333 |
| 4,141,152 A | * | 2/1979 | White | ........... 33/355 R |
| 4,395,828 A | * | 8/1983 | Juhas | ........... 33/272 |
| 4,402,140 A | * | 9/1983 | Nagae | ........... 33/272 |
| 5,151,753 A | * | 9/1992 | Whitman, III | ........... 356/142 |

\* cited by examiner

*Primary Examiner*—G. Bradley Bennett
*Assistant Examiner*—Amy R. Cohen

(57) ABSTRACT

A simple self-contained, hand-held instrument for reading an azimuth or bearing in relation to the earth's magnetic field either out in the field or on the water with substantial accuracy. Means are provided that places the far object into the same focal plane (or focal point) as the close up bearings on the compass disc face, thus allowing the eye to instantly see both images without adjustment between near-sight and far-sight. Means are also provided for the adjustment of the instrument for the local variation or declination of the earth's magnetic field versus that of true north.

4 Claims, 6 Drawing Sheets

Schematical Diagram

Compass reading area and Declination Adjustment

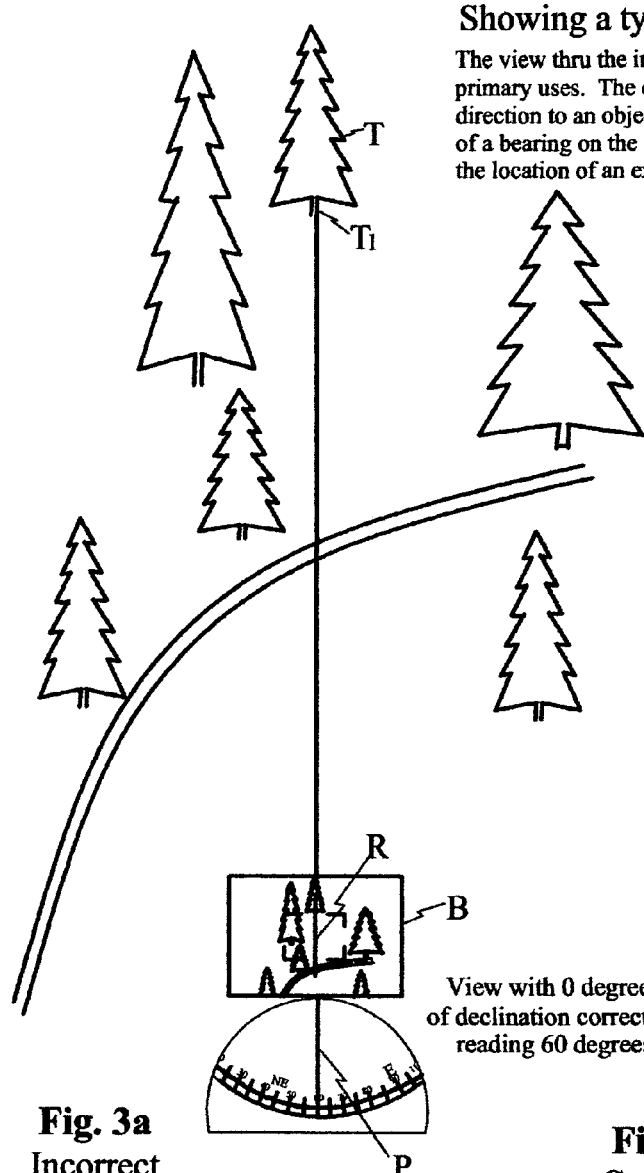
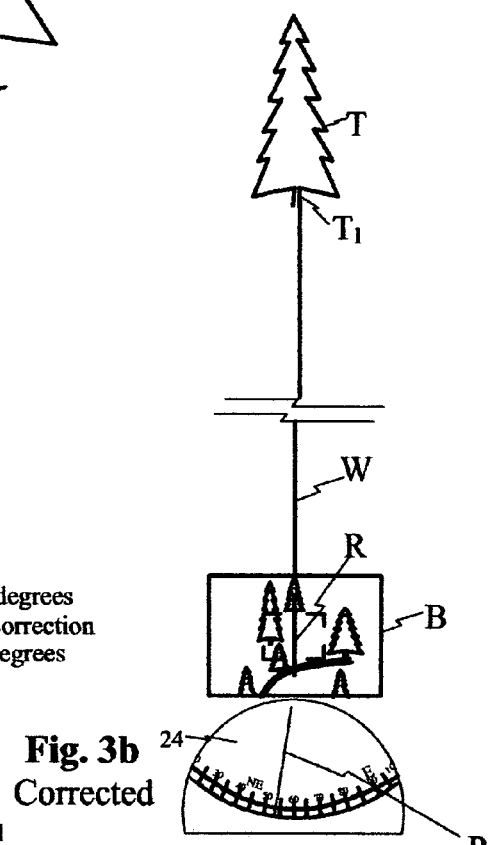

Showing a typical viewing in the field.

The view thru the instrument is the same in either of it's primary uses. The example below can be the user determining direction to an object or location, or it can be the sighting of a bearing on the landscape as a direction of travel or the location of an existing object, e.g., a survey stake.

Example uses civilian markings based on 360 degrees.

Military markings optional based on 0 to 64

View with 0 degrees of declination correction reading 60 degrees

Fig. 3a
Incorrect

Fig. 3b
Corrected

View with -6.5 degrees of declination adjustment reading 53.5 degrees True

This specific example assumes a correct bearing is needed to a location at the base of the furtherest tree, e.g., survey stake location. Aligning the upper viewing center line (R) and reading the results on the lower viewing line (P) gives an accurate answer if the declination correction has been set.

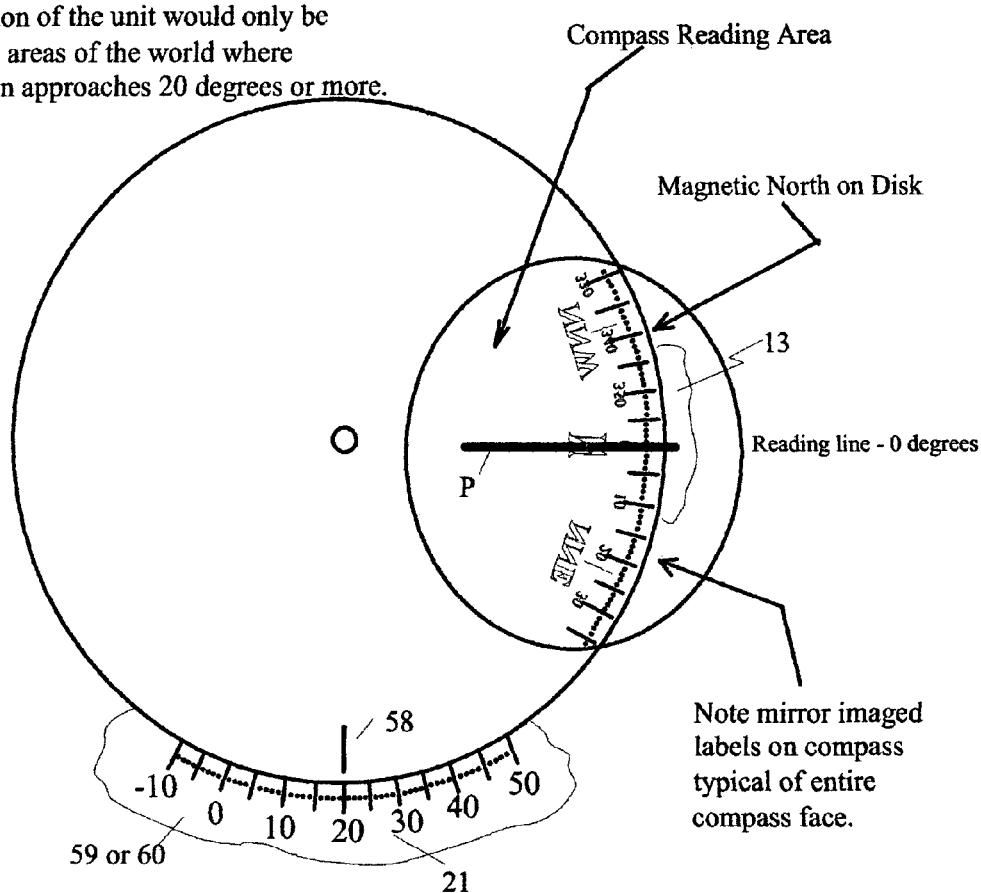

Cut View

Side

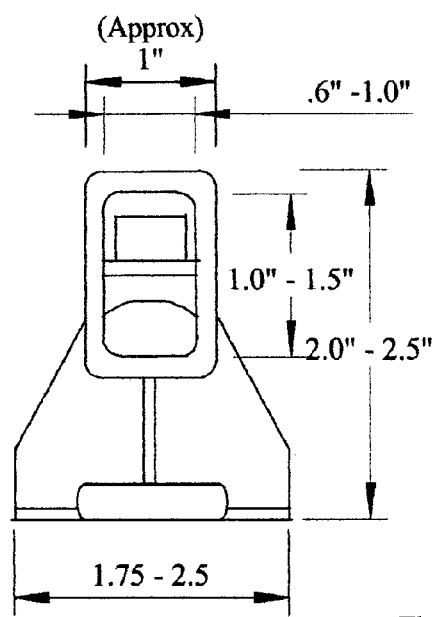
Fig. 5c Back
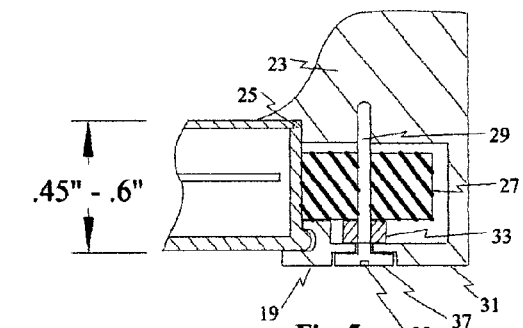
Fig. 5g
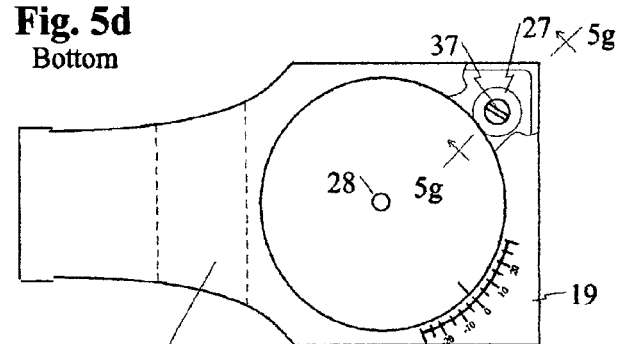
Fig. 5d Bottom
Thumb Indentation
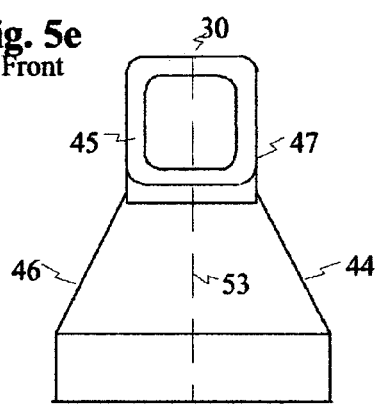
Fig. 5e Front
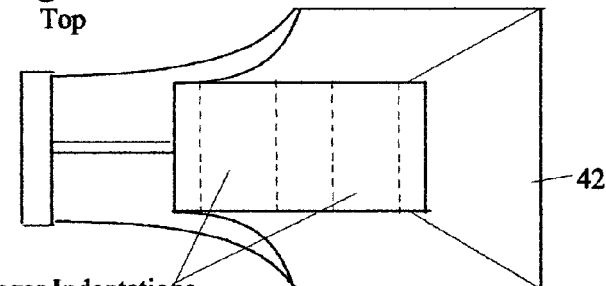
Fig. 5f Top
Finger Indentations

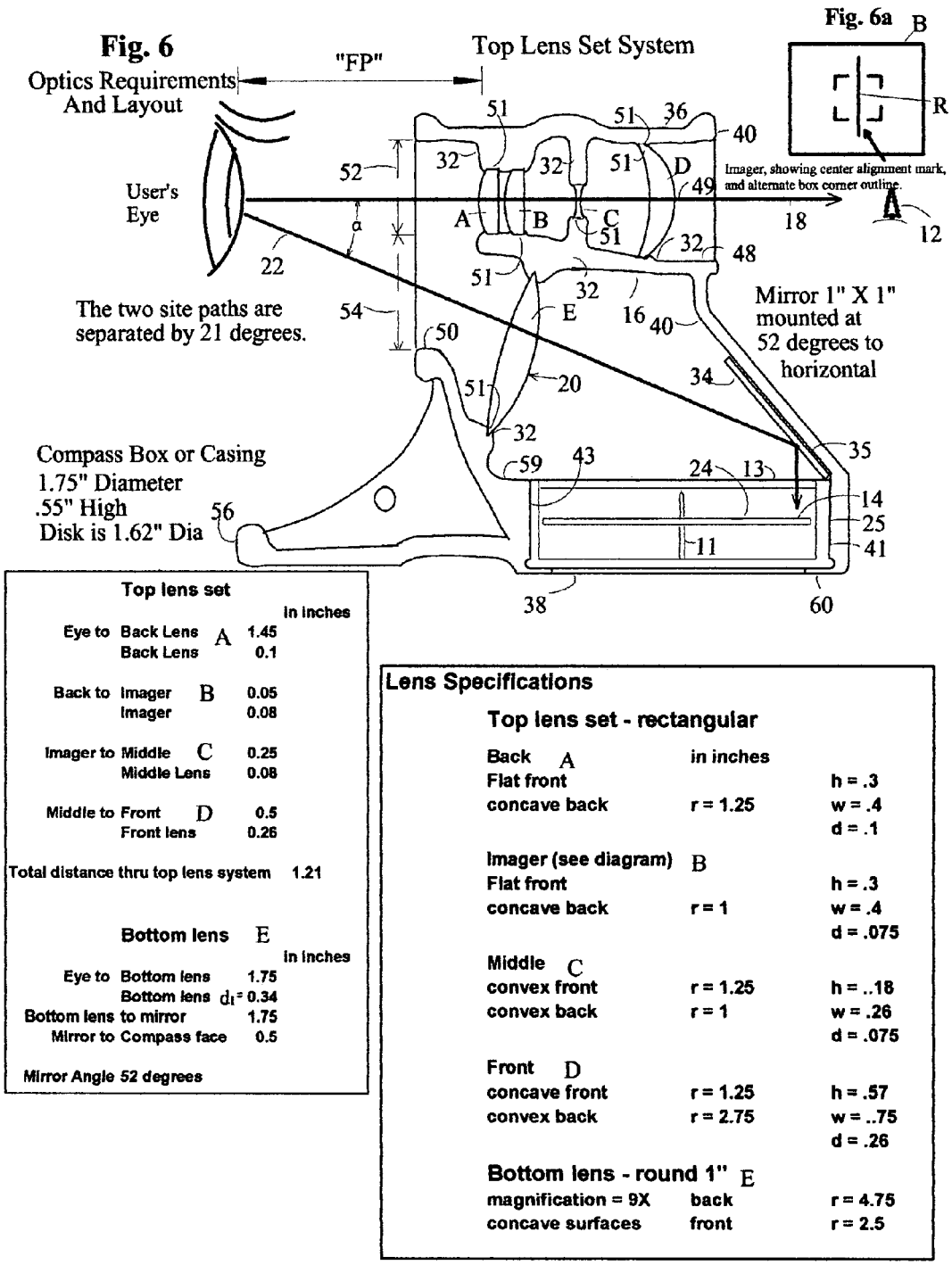

MAGNETIC COMPASS STRUCTURE

This application claims priority under 35 U.S.C. 119(e)(1) based on Applicants Provisional U.S. Patent Application Ser. No. 60/665,686 filed Mar. 28, 2005 and titled "HANDHELD OPTICAL MAGNETIC EARTH FIELD BASED BEARING DETERMINING INSTRUMENT".

BACKGROUND OF THE INVENTION

1. Field

The invention lies in the field of orienteering, positioning and surveying instruments in general. More specifically, it refers to compass structure that allows a specific compass bearing to be identified with great accuracy, even for one with poor eyesight. More specifically the invention features a small handheld self-contained compass structure having a distant object viewing system and a compass face indicia viewing system, wherein the lines of sight of the two systems (lens sets) are in general alignment and wherein the focal points (on the viewers eye) for both systems are substantially coextensive, and whereby extremely rapid eye sighting from one line of sight to the other will not require any significant physiological change in the users eye lens.

2. Prior Art

There is considerable prior art in the area of sighting compasses, navigational instruments or peloris, and optical viewing instruments. There are commonly found small handheld instruments with open sights and mirrors to allow the compass bearing readings to be viewed. There are existing instruments that allow a magnified viewing of the compass bearing readings. However, these prior instruments lack accuracy because it is not possible to see the bearing information, both far and close, practically simultaneously without moving the head or unit and thus the body, and without refocusing of the viewers eye lens.

Also, there are more complicated units such as in U.S. Pat. No. 2,970,510 that magnify the compass bearing readings and insert them into the field of view of the far target. These instruments are complicated to construct and/or they block the viewing of the far target. Since it is essential that any magnetic disk type compass be held at a level position, having a part of the distance viewing blocked and not being able to tilt the compass to compensate can make it unusable in a field situation. Also, no teaching of creating a collaborative pair of sighting systems having the same focal point as in the present invention is present in any of the prior art.

There is not an instrument that both (a) leaves the field of view of the far target unobstructed, and (b) delivers to the observer corrected views of both the far and near target to the same focal plane or point, with magnification of the bearing readings for increased accuracy. Nor is there such an instrument that allow declination correction with accuracy and ease and an instrument with so few parts. Nor is there an instrument that can give accurate readings with such an ease of use and that can be as compactly constructed and at such a light weight for use by backpackers or others where weight is a big consideration.

Further, in conjunction with the present compass structure in a preferred embodiment with an object alignment mark on the separate, isolated far distance viewing system, and with magnification of the compass face viewing, it is possible to achieve an accuracy in measurement not available in any current handheld compass devices. One-half degree increments of markings of ⅛ inch in length and less and with similar spacings therebetween are easily discernable on an appropriate magnetic disk.

SUMMARY OF THE INVENTION

The weaknesses and disadvantages of the prior art instruments are overcome and the objectives of this invention are attained by an instrument in which there is a frame supporting a sighting means for far distance object viewing and a second sighting means for near distance viewing of a compass face with magnification, both sighting means focusing on one location where the eye of the observer is placed, and in conjunction with an each sighting means being separate and isolated from the appropriate disk type compass having a compass heading face for the near distance viewing, the operator can see both targets simultaneously. The eye simply looks slightly down or looks straight ahead, very rapidly. No movement of the device or head is necessary to attain proper alignment which can then be held steady for reading.

An angular adjustment to the compass body alignment mark (reading indica mark on clear compass cover) associated with the disk compass allows an easy correction for declination. Where local declination is extreme however, (plus 20 degrees or minus 20 degrees, for example) then the magnetic disk itself is angularly adjusted in appropriate increments, and the adjustment graph on the unit is changed to match.

OBJECTS AND ADVANTAGES

It is a primary object of this invention to provide a simple, inexpensive, self-contained compass unit that will provide information relative to the precise location of any object, particularly distant, relative to the position of the observer with an accuracy not obtainable by any other such hand-held unit.

It is a further object of this invention to have a device usable by a novice at the same high accuracy as an expert, including means for easily making a correction for declination.

It is a further object of this invention to have a device that is easily produced at a low cost.

BRIEF DESCRIPTION OF THE DRAWINGS

These and other objects of the invention and an understanding of the details and principles of the invention will become evident from the following description, taken in conjunction with the appended drawings, in which the various structures are not drawn to scale or consistent proportions, and wherein:

FIG. 3a represents a typical viewing in the field, with the upper view showing the field and target object (T), and the bottom view showing the magnified viewing of a compass disk set with zero degrees declination, and incorrectly reading exactly sixty degrees;

FIG. 3b represents a typical viewing in the field, with the upper view showing the field and target object and the bottom view showing the magnified viewing of a compass disk set with 6.5 degrees declination, and reading the correct 53.5 degrees. This correction for declination (the difference between true North and magnetic North) allows for accurate readings without calculating the results separately;

FIG. 4 represents a modification to the present unit where both the declination adjustment scale on the housing and the point of magnetic attraction on the disk magnetic north pole, normally the 0° mark) are both angularly moved twenty degrees, allowing additional compensation for declination in areas where the need for such exceeds twenty degrees. This would keep the zero degree mark on the compass cover 13 towards the center of the viewing area;

FIGS. 5b thru 5f show external views of the same (5a) housing from front, back, top, bottom and side with dimensions in inches;

FIG. 5g is a cross-sectional enlargement of the under bottom declination adjustment mechanism of FIG. 5d taken generally along line 5g-5g in FIG. 5d;

FIG. 6 represents a detailed cross-sectional layout of the lensing and other optics for the preferred embodiment of this invention, including lens specifications and spacing. This is one of many possible combinations of lensing and the appropriate spacing for the optics chosen in which the goals of this invention may be met; and FIG. 6A shows the alignment markings on (B).

DESCRIPTION OF PREFERRED EMBODIMENT

Using a conventional disk magnetic compass or an equivalent of the same, two separate imaging systems allow focusing on (1) the target object or spot in the distance, and (2) the compass bearing of the hand held instrument. For the first objective four lenses and a vertical marker allow a corrected distant view. For the second objective a magnifying lens and small mirror allows a detailed viewing of a compass readout, with a movable reading mark correctable for declination. When declination exceeds twenty degrees at a location then a manufacturing modification is made to allow accurate adjustment for a specified area.

Figure 1:
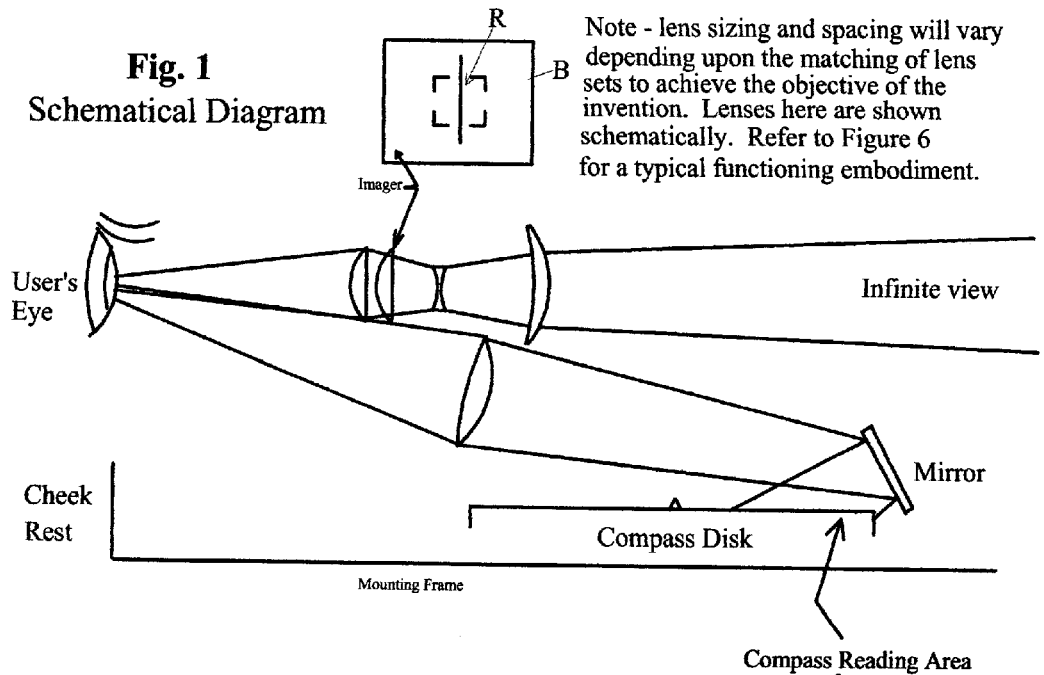
FIG. 1 represents schematically the basis on which the instrument operates, showing a side view of one embodiment of an internal layout of the lensing, mirroring, and magnetic disk required to meet the various objects for this invention.

FIG. 1 is a basic schematic diagram of a typical embodiment of the invention. With the eye at the established location, two sets of optics allow the viewing of either set of information from the same location. In this embodiment, for the far view lens elements (A-D) allows the far view to be observed with the eye focused or adjusted for nearsighted viewing. A template or imager (B) is inserted to add a centerline indication to the viewfinder. A second line of sight is focused to the same location, with a magnifying lens (E) showing the image of a magnetic disk 24 thru a mirror 34, also focused for close observation. The magnetic disk 24 is free floating on a shaft 11, and surrounded by a liquid such as a light oil to dampen the movement of the disk. On the disk is printed, for example, a scale of 360 degrees in one degree increments. Over this disk is a clear cover 13 with an inscribed mark 58 on the cover edge which, in conjunction with the printed scale on the magnetic disk, allows the eye to read an exact heading (bearing). For this purpose the numerals and lettering on the compass disk are printed in mirror image, i.e., backwards.

Figure 2:
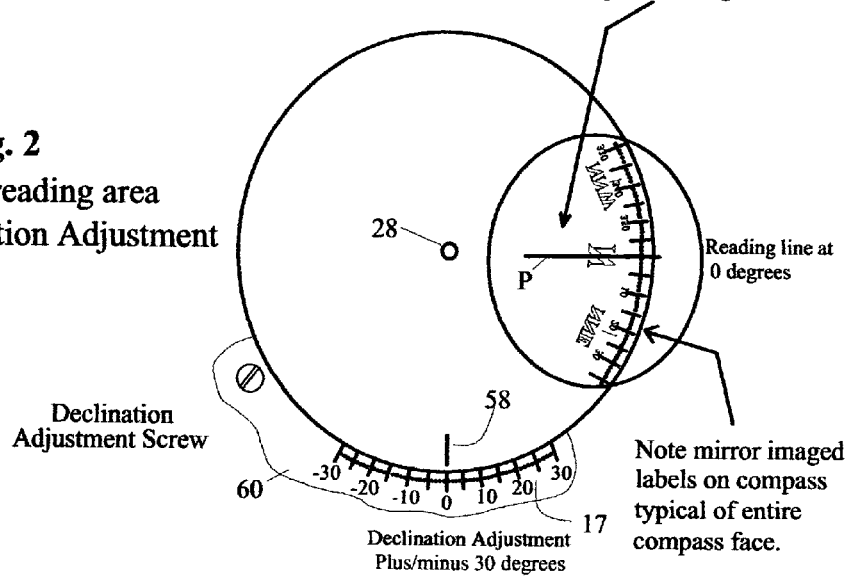
FIG. 2 shows a typical set of declination adjustment markings.
Figure 5A:
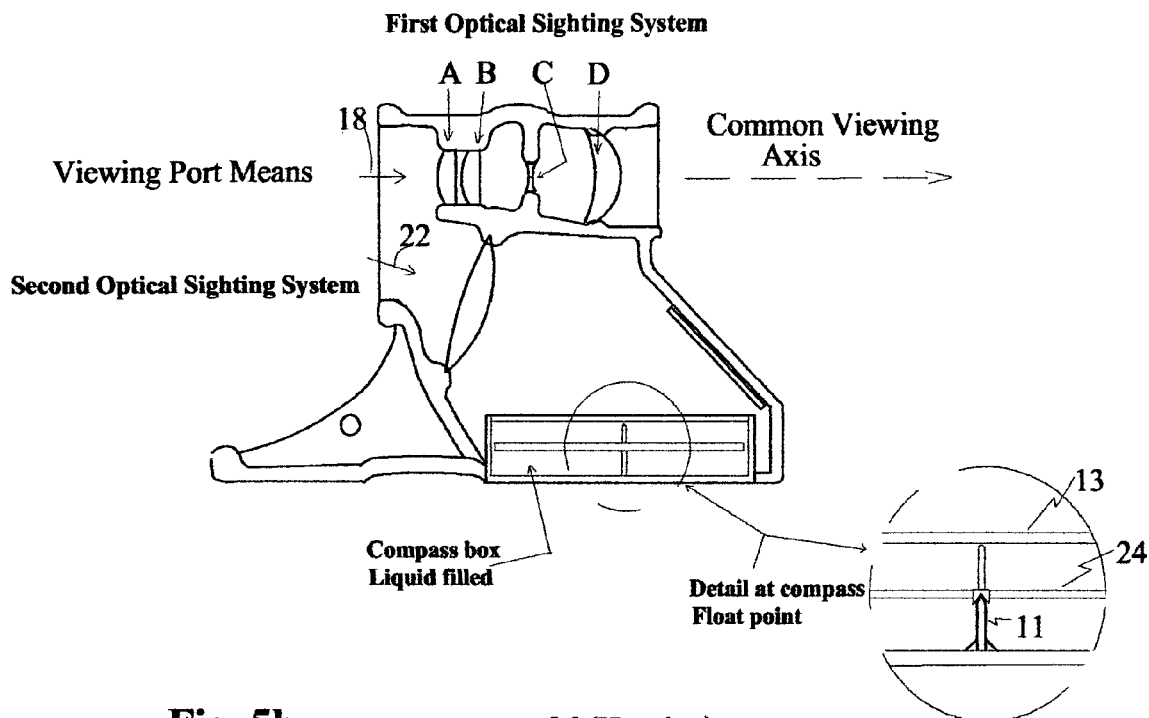
FIG. 5a represents a longitudinal cross-sectional view of a typical embodiment of this invention.
Figure 5B:
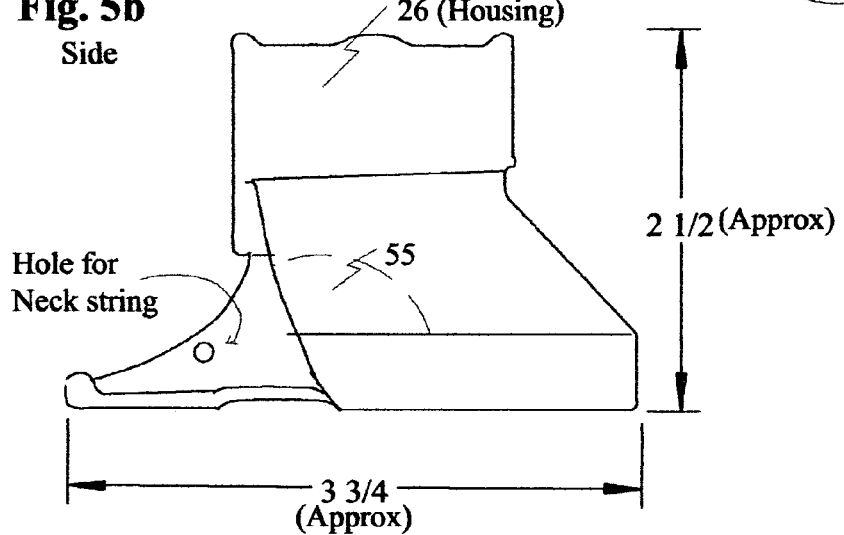

FIG. 2 shows schematically a magnetic disk showing a portion of the 360° heading indicia, and the declination adjustment markings for plus or minus 30 degrees as viewed thru clear plastic window 55 marked by dotted line in FIG. 5b. However, with the pre-adjustment of the magnetic disk itself in specific increments this scale would be changed to match the magnetic adjustment. For instance, if the magnetic disk were adjusted for a plus twenty degrees, this scale might read from minus ten to plus fifty degrees, as shown in FIG. 4. These adjustment markings 17 on either the inside edge 59 or bottom side 19 of housing 26 allow the angular movement and setting of the inscribed mark P noted above to a varying location above the magnetic disk matching the necessary adjustment for local variation or declination of magnetic north with true north.

Referring further to the drawings and with particular reference to the claims herein, the present invention comprises a compass instrument 10 having structure for substantially simultaneously viewing a distant, e.g., 100 yards-100 mile away object 12 and a compass heading therefor with great accuracy without the need for eye refocusing, said structure comprising the components of a distant object sighting top lens set (viewing system) 16 having a distant viewing axis 18, a compass indicia sighting bottom lens set 20 (viewing system) having an indicia viewing axis 22, and a compass with magnetic disc 24 having peripheral heading indicia 14 thereon, said components being mounted in top-down order on a frame or housing 26 with said axes and the center 28 of said disc being in substantial symmetrical and vertical alignment in a vertical plane 30, said viewing axes diverging from each other in said plane 30 at an angle "α" of from about 10° to about 30°, and said top and bottom lens sets giving substantially the same focal point whereby the viewers eye lens does not have to reconfigure to allow the viewer to clearly see the distant object and the compass heading indicia even though the viewers up and down eye movement cycle may occur at millisecond speeds.

Referring now to the example of FIG. 3b a schematic diagram is shown in which a direction of travel is required as 53.5 degrees from the location of the user based on a horizontal angle in relation to true north. The user holds the unit close to his eye (stop surface 56 against cheek) and turns his/her body until the lower view (thru lens E) shows a compass heading of exactly 53.3 degrees from the true north direction. Then an exact line on the terrain is observed thru the upper imager (B) that corresponds with the center or viewing line (R) on (B) (FIG. 6a). A target is then chosen that corresponds with this viewing line (R) and an exact point is chosen on that target. In this example the point would be the right side of the base $(T_1)$ of the furthest tree (T).

As another example, using the same FIG. 3b wherein an observer needs the exact angle from the observer's current location to the right side $(T_1)$ of the base of the furthest tree (T), the observer sets the center line R of the upper viewer so that it intersects the target $T_1$, then observes the compass heading on the lower viewer to within a half degree.

Both of the previous examples assume that the instrument has been preset/adjusted to the proper local magnetic declination for accurate results.

FIG. 4 shows a variation of the declination adjustment 21 showing from 10 to 50 degrees. This requires a remarking of the magnetic disk 24 for a variation of 20 degrees by rotating the markings on the magnetic disk accordingly. No variation of the simple method of operation of the unit is required, however viewing of accurate adjusted angles is possible where there are extreme variations in the earth's magnetic field versus true north. Various models can accommodate all spectrums of magnetic declination.

In FIG. 6 exemplary lens sets and dimensions are shown as well as some preferred dimensions of the housing (frame) 26 and compass. The top lens set is provided by elements (A-D) having the configuration and dimensional specifications shown in the charts of FIG. 6, wherein "d" is the lens thickness on axis 18 and $d_1$ is the thickness on axis 22. These lenses are set, e.g., by adhesive into supporting portions generally designated 32 of non-magnetic (plastic, brass, ceramic, etc.) frame 26 having a transparent or translucent section for lighted viewing. This is done by forming the housing 26 in clam shell type halves 45, 47 (FIG. 5E) preferably having notches 51 into which the edges of the lenses can fit as the halves are assembled. The halves are then adhesively or otherwise attached along the center cut line 53. The distances between these lenses on axis 18 are noted in these charts in inches.

The focal point distance (FP) shown in FIG. 6 of 1.45 inches to lens (A) from the viewers eye along axis 18 is a proven preferred one for the instrument as shown, however, depending on the designers objectives, other lens systems and housing structures can be employed as long as a comfortable focal point for the top and bottom two lens systems is effected. For example, (FP) can range from 0.5-2.0 in. Regarding the bottom lens (E), the specifications for lens (E) are given in the charts of FIG. 6. The angle of mirror face 34 from the horizontal is approximately 52° and the mirror is adhesively secured or the like at 35 to front end wall 40. Lens (E) also is secured to portions 32 of the housing by adhesive or equivalent.

Referring to FIGS. 5d and 5g, a useful type of declination adjustment mechanism is shown wherein a portion of the housing wall 23 is removed to allow the body wall 25 of the compass to protrude into contact with an elastomeric roller 27 which is fixed to a circular shaft or armature 29 rotatably mounted in the housing base 31 and wall 23. Armature 29 is rotatable in spacer 33 and the circular head 37 thereof is provided with a slot 39. This slot can receive a screw driver or small coin edge or knife blade or the like for rotating the armature and roller to rotate the compass disc the required amount for the declination adjustment.

Referring to FIG. 6, the compass body 41 is snugly but rotatably mounted in recess 43 in the housing whereby the frictional compressive contact of body wall 25 with roller 27 will ordinarily fix the angular position of the compass within the housing until the roller is forcibly rotated by a screw driver or the like.

The housing or frame 26 is configured in the embodiment shown to provide a substantially enclosing structure having a top 36, bottom 38, front end wall 40, rear end wall 42 and side walls 44, 46. Wall 40 is apertured at 48 to provide a distant viewing forward port 49, and wall 42 is apertured at 50 to provide an upper distant viewing port area represented by dotted line 52, and a lower compass indicia viewing port area 54 represented by dotted line 54. It is noted that the areas 52 and 54 and the viewing paths (axes) 18 and 22 which these areas serve are separate and distinct from each other, i.e., no occlusion of one by the other.

The invention has been described in detail with particular reference to preferred embodiments thereof, but it will be understood that variations and modifications will be effected with the spirit and scope of the invention.

I claim:

1. A compass instrument having structure for substantially simultaneously viewing a distant object and a compass heading therefore with great accuracy without the need for eye refocusing, said structure comprising the components of a distant object sighting first lens system having a first viewing axis, a separate compass indicia sighting second lens system having a second viewing axis, and a compass having a casing with a magnetic disk rotatably mounted therein, said disk having peripheral heading indicia, said components being mounted in top-down order on a housing with said axes and the center of said disk being in substantial symmetrical and vertical alignment on a vertical plane, the two viewing axes diverging from each other in said plane at an angle of from about 10 degrees to about 30 degrees, and said first and second lens systems having substantially the same focal point whereby the viewers eye lens does not have to reconfigure and the viewer can clearly see the distant object and the heading indicia even though the up and down eye movement cycle may occur at millisecond speed.

2. The compass instrument as in claim 1 wherein said casing has an adjustable clear cover (13) with an inscribed reference mark (58) on its periphery and positioned over the periphery of the magnetic disk and generally centered within the field of view of the second (compass indicia sighting) lens system (E), and a scale (17) associated with the cover for setting local declination corrections which show the variation of said mark (58) from the centered angular position to a specific off-centered angular position, and rotative means mounted on said housing for rotating the casing and mark so that the setting of the mark to an off-centered position can be accomplished and held by frictional forces.

3. The compass instrument as in claim 2 with the scale (17) of the local declination corrections adjusted for a match with the degrees scale of said magnetic disk pre-adjusted in its manufacturing to accommodate extreme variations in the earth's magnetic field in relation to the earth's rotational axis as is found in certain regions.

4. The compass instrument as in claim 1 wherein said compass casing has a diameter of from about 1.5 to 2.0 in., and a height of from about 0.45-0.60 in. wherein said housing as an overall length of from about 3.5-4.0 in., an overall height of from about 2.0-3.0 in., an overall width of from about 1.75-2.5 in., wherein the height of the viewing aperture 50 is from about 1.0-1.5, and wherein the width of said aperture is from about 0.6-1.0 in.

\* \* \* \* \*